UNITED STATES PATENT OFFICE.

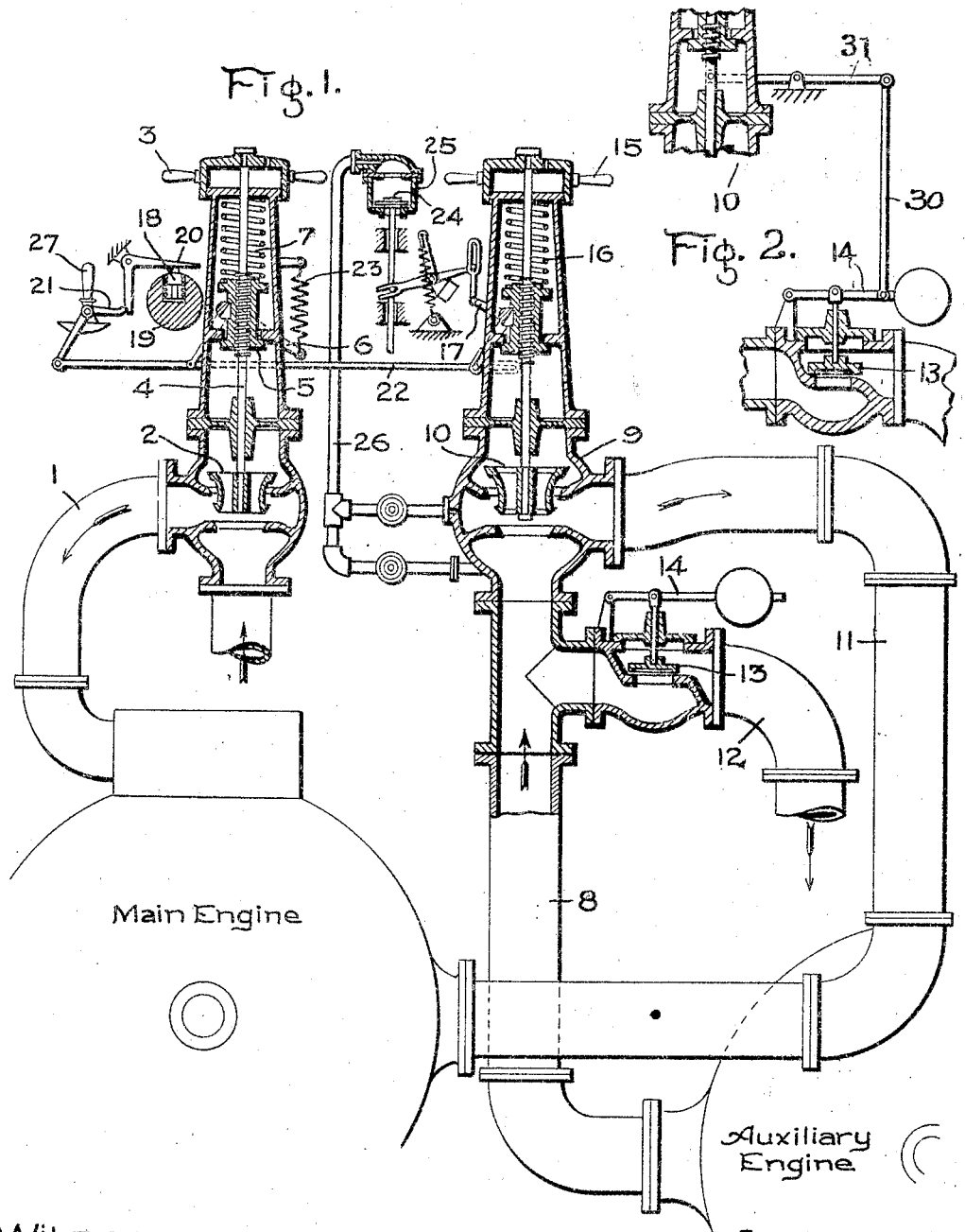

LUDWIG CUBELIC, OF CHARLOTTENBURG, GERMANY, ASSIGNOR TO GENERAL ELECTRIC COMPANY, A CORPORATION OF NEW YORK.

STEAM-CONTROLLING APPARATUS.

1,093,917. Specification of Letters Patent. Patented Apr. 21, 1914.

Application filed June 20, 1912. Serial No. 704,890.

*To all whom it may concern:*

Be it known that I, LUDWIG CUBELIC, a subject of the King of Prussia, residing at Charlottenburg, Germany, have invented certain new and useful Improvements in Steam-Controlling Apparatus, of which the following is a specification.

This invention relates to steam engines, and especially to an installation in which the exhaust steam or gas from one or more auxiliary engines or other apparatus is supplied to an intermediate stage of the main engine. In installations of this character, particularly where the engines are separately loaded, it may often occur that the auxiliary engine or engines will be operating under full or partial load, while the main engine may be operating with very light load or friction load only. Under these circumstances the low pressure fluid exhausting from the auxiliary engine or engines and entering the main engine would be sufficient to cause the latter to race if continuously supplied thereto.

An object of the present invention is to provide a controlling apparatus which, when the condition just referred to occurs, will act automatically to cut off the supply of low pressure fluid to the main engine.

In order that the auxiliary engine or engines may continue in operation after the controlling apparatus has operated to stop the flow of exhaust fluid therefrom to the main engine it is necessary that a second or supplementary exhaust path be provided. To this end I provide means which operates to open a second or supplementary exhaust path when the controlling valve functions to cut off the path of flow from the auxiliary engine or engines to the main engine. This second or supplementary exhaust path may lead to atmosphere or to a suitable condenser or other apparatus, or to a still lower stage of the main engine in some instances. I preferably construct this means to be operated automatically by fluid pressure, as will be explained more fully hereinafter, but I may, if found desirable, arrange automatic means to positively actuate the same.

In carrying out my invention I provide a suitable conduit for conveying the exhaust steam from the auxiliary engine or engines to the main engine. In this conduit I arrange a suitable controlling valve which is automatically closed when the load on the main engine reaches a predetermined low value.

As is well known, in a multi-stage turbine the pressures in the successive stages lower considerably in passing from full load to light load or to friction load, and I take advantage of this fact as a means for indicating a condition of light load on the main engine. I accordingly provide means which will automatically close the controlling valve when the pressure in the conduit conveying the exhaust steam reaches a predetermined low value thereby indicating light or no load on the main engine.

As one arrangement for carrying out my invention, I may provide a controlling valve biased to the closed position and held open by a catch, which catch is released by suitable means operated when the pressure in the exhaust conduit lowers to a certain predetermined value. In carrying out my invention I also provide valve means controlling the supply of high pressure fluid to the main engine and an emergency governor which acts to close such valve means together with the valve means which controls the supply of low pressure fluid to the main engine when the main engine tends to race.

The details of construction of the apparatus will appear from the following detailed description thereof, taken in connection with the accompanying drawing, in which—

Figure 1 is a diagrammatic representation of the parts which go to make up the novel portion of the entire installation and Fig. 2 is a detail illustrating a modification.

The main and auxiliary engines are not illustrated in detail, but the live steam for the main engine is conveyed through the pipe 1, which is controlled by a throttle valve 2, operable by a hand wheel 3 which turns the valve stem 4. A screw-threaded portion of said stem meshes with a nut 5 to cause the raising and lowering of the valve. The nut is held normally in a given position by a catch 6, the tripping of which permits a spring 7 to force down the nut and thereby shut the valve. The hand wheel 3 is preferably made in the form of a cylinder having a sliding fit on the top of the valve casing and acting as a cushioning device when the valve is closed by the spring.

The exhaust steam or gas from the auxiliary engine or engines is conveyed by a suitable conduit or conduits as by a pipe 8 to a valve casing 9 containing a valve 10 which controls the flow of such steam to a pipe 11 by which it is conducted to a lower stage of the main engine. Leading from the pipe 8 is a branch pipe 12 which affords an alternative path for the steam to the atmosphere or to a condenser or other apparatus or to a still lower stage of the main engine. This branch pipe is provided with a check valve 13 which is normally held closed by yielding means, such as the weighted lever 14, but will open outwardly when the pressure in the pipe 8 reaches a predetermined point. The valve 10 is similar in construction to the valve 2, and can be opened and closed by hand by the wheel 15, or closed by a spring 16 when released from the catch 17.

The two catches 6, 17 are arranged to be simultaneously tripped by an emergency governor when the speed of the main engine exceeds a safe maximum; such a governor for instance as a radially movable weight 18 in the main shaft 19 operating by centrifugal force to actuate a lever 20 which trips the catch 21 and releases the connecting rod 22 attached to the catches 6, 17, and moved by a spring 23 or the like. The catch 17 has a lost motion connection with the rod 22 so that it can be moved independently when desired by a pressure responsive device, such as the piston 24 in the cylinder 25, exposed on one side to atmospheric pressure and on the other to the pressure of the steam in the valve casing 9 by means of the pipe 26.

With this construction, if the auxiliary machine is uniformly loaded, while the load on the main engine is greatly reduced, the main engine would race, if the same amount of exhaust steam is continuously supplied to it, since its regulator does not readily act to govern this amount. The decrease of load on the main engine, however, results in its governor reducing the supply of live steam, so that the pressure in all its stages becomes reduced. This causes a lower pressure in the valve casing 9 and cylinder 25, so that the piston 24 will be lifted by the atmospheric pressure and thus the catch 17 will be tripped and the valve 10 will be closed. This causes a piling up of pressure in the pipe 8 sufficient to lift the check valve 13, so that the exhaust steam can pass through the branch pipe 12, and the operation of the auxiliary machine will not be interfered with.

In case of necessity, the valves 2 and 10 can be closed simultaneously by hand, by operating the lever 27 to trip the catches 6 and 17, so that the racing of the main engine is avoided under all circumstances.

If desired the check valve, instead of being pressure operated as shown in Fig. 1, may be positively moved mechanically. I have shown such an arrangement in Fig. 2 wherein the lever 14 is connected through link 30 and lever 31 to the stem of valve 10. According to this modification the check valve 13 will be positively moved from its seat whenever the valve 10 closes.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a multi-stage turbine, of a pipe conveying low pressure steam to an intermediate stage thereof, and means responsive to a drop in the steam pressure in said intermediate stage for stopping the flow of low pressure steam to said stage.

2. The combination with a multi-stage turbine, of a pipe conveying low pressure steam to an intermediate stage thereof, a piston responsive to a drop in the steam pressure in said intermediate stage, and a valve controlled by said piston and operating to stop the flow of low pressure steam to said stage.

3. The combination with a multi-stage turbine, of a pipe conveying low pressure steam to an intermediate stage thereof, an escape pipe opening from the low pressure steam pipe, a valve controlling said escape pipe, and means for controlling said valve, said means comprising a movable abutment exposed on one side to the pressure of an intermediate stage and operating to cause the valve to open when the pressure in the intermediate stage falls below a predetermined minimum.

4. The combination of a mixed pressure main engine, an auxiliary engine, a supply of high pressure fluid for the main engine, valve means controlling such supply, a conduit connecting the exhaust of the auxiliary engine to an intermediate stage of the main engine, valve means in such conduit, an emergency governor which acts on both said valve means to close the same when the speed of the main engine becomes excessive, and means responsive to the pressure of the low pressure fluid which acts to shut off the supply thereof when said pressure becomes too low.

5. The combination of a mixed pressure main engine, an auxiliary engine, a supply of high pressure fluid for the main engine, valve means controlling such supply, a conduit connecting the exhaust of the auxiliary engine to an intermediate stage of the main engine, valve means in such conduit, an emergency governor which acts on both said valve means to close the same when the speed of the main engine becomes excessive, means responsive to the pressure of the low pressure fluid which acts to shut off the supply thereof when said pressure becomes too low, a second exhaust conduit, and means controlled by the pressure in said first named conduit for connecting the exhaust of the auxiliary engine to said second exhaust conduit.

6. The combination with two motors one of which exhausts into the other, of a device responsive to the pressure of the fluid from the first motor flowing to the second which when this pressure becomes too low closes the passage and opens another path of exhaust for the fluid.

7. The combination with a plurality of motors one of which exhausts into the other, of valve means controlling the passage of fluid from one motor to the other, valve means controlling an independent supply of fluid to the second motor, and means controlled by the speed of the second motor for shutting off both supplies of fluid when the speed becomes excessive and opening another path of exhaust for the first motor.

8. The combination of a main engine, an auxiliary engine exhausting into an intermediate stage thereof, means controlled by the pressure of the exhaust from the auxiliary engine which closes the passage into the main engine and opens another path for the exhaust when said pressure becomes too low, and means controlled by the speed of the main engine for changing the path of exhaust as just set forth and cutting off the main supply of motive fluid to the main engine when the speed of the main engine becomes excessive.

9. The combination of a main engine, a supply of high pressure fluid for the main engine, an auxiliary engine, a conduit connecting the exhaust of the auxiliary engine to an intermediate stage of the main engine, a valve biased to the closed position controlling the passage of fluid through the conduit, means for holding said valve open, means for releasing said holding means when the load on said main engine reaches a certain predetermined low value, a second exhaust, a valve therein, and means brought into operation by the closing of said first named valve for causing the second named valve to open whereby the operation of the auxiliary engine will not be interfered with.

In witness whereof, I have hereunto set my hand this first day of June, 1912.

LUDWIG CUBELIC.

Witnesses:
    FRIEDRICH GANZERT,
    OTTO SCHMIDT.